United States Patent

Otsuji et al.

[11] Patent Number: 6,123,339
[45] Date of Patent: *Sep. 26, 2000

[54] NON-GASKET SEALING STRUCTURE

[75] Inventors: Hiroshi Otsuji; Masato Nagawa, both of Fukuoka, Japan

[73] Assignee: Daiso Corporation, Fukuoka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/859,399

[22] Filed: May 20, 1997

[51] Int. Cl.⁷ .............................. F16J 15/02; F16L 19/02
[52] U.S. Cl. .................... 277/602; 277/617; 277/626; 285/110
[58] Field of Search ....................... 277/602, 617, 277/625, 626, 400; 138/109; 285/917, 110

[56] References Cited

U.S. PATENT DOCUMENTS

| | | | |
|---|---|---|---|
| 789,541 | 5/1905 | Hayes | 285/917 X |
| 1,468,187 | 9/1923 | Werbeck | 285/917 X |
| 1,715,854 | 6/1929 | McKenzie-Martyn | 285/917 X |
| 1,859,065 | 5/1932 | Anderson | 285/110 X |
| 3,083,989 | 4/1963 | Press | 285/917 X |
| 4,743,035 | 5/1988 | Van Loom et al. | 288/110 X |
| 4,848,807 | 7/1989 | Christianson | 285/110 |

FOREIGN PATENT DOCUMENTS

| | | | |
|---|---|---|---|
| 1240179 | 7/1960 | France | 285/917 |
| 0463200 | 7/1928 | Germany | 285/917 |
| 0520755 | 3/1931 | Germany | 285/917 |
| 55-089888 | 6/1980 | Japan . | |
| 3-081487 | 4/1983 | Japan . | |
| 58-054519 | 4/1983 | Japan . | |
| 58-065391 | 4/1983 | Japan . | |
| 61-206120 | 12/1986 | Japan . | |
| 63-042992 | 3/1988 | Japan . | |
| 63-060789 | 4/1988 | Japan . | |
| 63-086491 | 6/1988 | Japan . | |
| 64-015893 | 1/1989 | Japan . | |
| 64-057484 | 4/1989 | Japan . | |
| 5-066393 | 9/1993 | Japan . | |
| 8-184393 | 7/1996 | Japan . | |
| 0854133 | 11/1960 | United Kingdom | 285/917 |

*Primary Examiner*—Lynne H. Browne
*Assistant Examiner*—John R. Cottingham
*Attorney, Agent, or Firm*—Griffin & Szipl, PC

[57] ABSTRACT

There is provided a sealing structure including a body portion having an outer surface at which the body portion is kept in contact with an opponent part, the body being formed with a bore therethrough, the body portion being formed at the outer surface thereof with at least one annular projection or recess designed to be swingable in a direction in which the bore extends. Since the annular projection or recess is designed to be swingable, when the body portion is connected to an opponent part through the outer surface thereof, the outer surface can be deformed, resulting in ensuring quite high sealing between the body portion and the opponent part.

6 Claims, 10 Drawing Sheets

NON-GASKET SEALING STRUCTURE

BACKGROUND OF THE INVENTION

1. Field of the Invention

The invention relates to a sealing structure such as a tube joint, and more particularly to a sealing structure eliminating the necessity of a gasket.

2. Description of the Related Art

In order to keep gastight and/or fluid-tight in apparatuses in which gas and/or fluid run(s) therethrough, various sealing materials have been employed. For instance, when fluid and gaseous materials as well as powder, particles and slurry are to be transferred through a plurality of tubes, those tubes are in general connected with each other through tube joints. One of conventional tube joints is illustrated in FIGS. 1A and 1B. The illustrated conventional tube joint 1 includes a body portion 2 made of metal, and a flange portion 3 formed integrally with the body portion 2 at one end of the body portion 2. The body and flange portions 2 and 3 is formed centrally with a bore 2a. The flange portion 3 has an outer surface 3a at which the tube joint 1 is connected to an opponent tube joint (not illustrated), and is formed with four holes 3b located coaxially with the bore 2a and spaced circumferentially equally to one another.

The tube joint 1 is used as follows. First, the tube joints 1 are welded to tubes at ends thereof. Then, the outer surfaces 3a of two tube joints are made close contact with each other with a gasket sandwiched therebetween. Then, bolts (not illustrated) are inserted into the holes 3b of the two tube joints, and then fastened by nuts to thereby connect the tube joints 1 to each other. Thus, the tubes are made in fluid communication with each other through the tube joints 1.

As mentioned above, the conventional tube joint requires the use of a gasket. However, it takes time and labor to dispose a gasket in position, resulting in reducing efficiency in arranging tubes. In addition, a gasket is in general made of fluorine contained resin to ensure high sealing ability. However, such a gasket is readily deformed or twisted to thereby deteriorate sealing ability of the gasket.

The above mentioned problems are common in apparatuses which need a gasket or packing in order to keep gastight and/or fluid-tight for preventing leakage of gas and/or fluid therefrom.

SUMMARY OF THE INVENTION

In view of the foregoing problems of conventional sealing materials such as a tube joint requiring a gasket to be used therewith, it is an object of the present invention to provide a sealing structure without the necessity of the use of a gasket.

There is provided a sealing structure comprising a body portion having an outer surface at which the body portion is kept in contact with an opponent part, the body being formed with a bore therethrough, the body portion being formed at an inner wall of the bore with at least one annular recessed portion.

There is further provided a sealing structure comprising a body portion having an outer surface at which the body portion is kept in contact with an opponent part, the body being formed with a bore therethrough, the body portion being formed at the outer surface thereof with at least one annular projection or recess designed to be swingable in a direction in which the bore extends.

For instance, the recessed portion may be an annular groove. When there is formed with a plurality of recessed portions, it is preferable that the recessed portions have different diameters, in which case, it is preferable that a recessed portion located closer to an outer surface of the body portion has a smaller diameter than diameters of other recessed portions. The formation of a plurality of the recessed portions provides greater resiliency to a portion of the outer surface located in the vicinity of the bore than a single recessed portion, thereby ensuring enhanced sealing ability.

The number, width and diameter of the recessed portions, and a depth with which the recessed portion located closest to the outer surface of the body portion is formed are determined in dependence on various factors such as a thickness of the body portion and material of which the body portio is made.

In order for the projection or recess to be swingable, the body portion may be formed at an inner wall of the bore with at least one annular recessed portion. For instance, the annular recessed portion may be an annular groove. As an alternative, the body portion may be formed a groove starting at the outer surface of the body portion and terminating at below the annular projection or recess, or the body may be formed a groove starting at an outer sidewall of the body portion and terminating at below the annular projection or recess. The recessed portion may be chamfered.

The recessed portion may be filled with resilient material having greater resiliency than that of the body portion. The recessed portion formed at an inner wall of the bore may generate turbulent flow in fluid flowing through the bore. Thus, it is possible to prevent generation of turbulent flow by filling the recessed portion with material. However, the material used has to have greater resiliency than a material of which the body portion is made, because if the material filled in the recessed portion is harder than the body portion, the annular projection or recess is not swingable.

It is preferable that the resilient material to be filled in the recessed portion is copper. Since copper has germicidal action, sterilization is expected in fluid flowing through the bore of the body portion.

A portion of the outer surface of the body portion located above the recessed portion may be designed to have an inclination so that the portion is in level with the outer surface of the body portion when the body portion is made in contact with an opponent part.

The annular projection or recess is located coaxially with the bore and may have a diameter equal to or smaller than an outer diameter of the recessed portion. The annular projection or recess may have any cross-section. For instance, the annular projection or recess may have a semicircular, triangular or rectangular cross-section.

The annular projection has a height determined in accordance with material of which the body portion is made, a diameter of the recessed portion, and a depth of the recessed portion measured from the outer surface of the body portion. When a plurality of the annular projections are to be formed, the annular projection having a smaller diameter may be designed to have a greater height than the annular projection having a greater diameter, which enables all distal ends of the annular projections to make contact with an outer surface of an opponent part, resulting in enhanced sealing ability. The projections may be designed to have the same height.

The body portion may be formed with a plurality of annular grooves having different diameters, in which case, an annular groove located closer to the outer surface of the body portion may have a smaller diameter than diameters of other annular grooves. It is preferable that the annular projection and recess are formed on the outer surface in the vicinity of the bore. As they are located closer to the bore, the outer surface has greater axial resilient deformation, resulting in greater coupling force between the body portion and the opponent part.

The body portion may be formed at the outer surface thereof with a raised or recessed region in which the annular projection or recess is formed.

It is preferable that the annular recess has a cross-section just fittable to a cross-section of an annular projection of an opponent part having an outer surface at which the opponent part makes contact with the body portion and on which the annular projection is formed.

The sealing structure may be applied to a tube joint. Herein, what is meant by the term "tube joint" includes a temporary joint, permanent joint, and an expansion joint. Specifically, a tube joint includes a flange joint such as a flange tube, a thin flange, a hub flange, and an integral flange, a joint such as a 90 degrees elbow, a 45 degrees elbow, a Y-shaped elbow, a T-shaped elbow, and a cross type elbow, and a union joint comprising two joints formed circumferentially with threaded portions and connected to each other by a cap nut engaged to the threaded portions of the two joints.

The tube joint may be made of metal such as ductile iron, carbon steel, alloy, stainless steel, aluminum and brass, or synthetic resin such as hard vinyl chloride and polyethylene. Material of which the tube joint is made is determined in dependence on a tube to which the tube joint is connected. The outer surface of the flange portion is formed in accordance with JIS B 2210 or JIS B 2220.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Hereinbelow are described preferred embodiments in which a sealing structure in accordance with the present invention is applied to a tube joint.

Figure 2A:
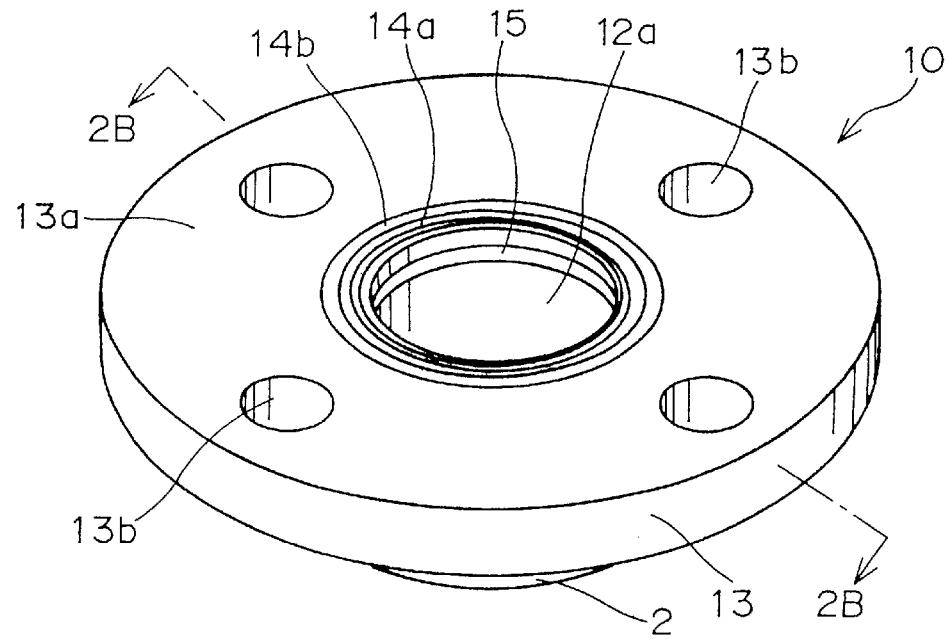
FIG. 2A is a perspective view illustrating a tube joint in accordance with the first embodiment of the present invention.
Figure 2B:
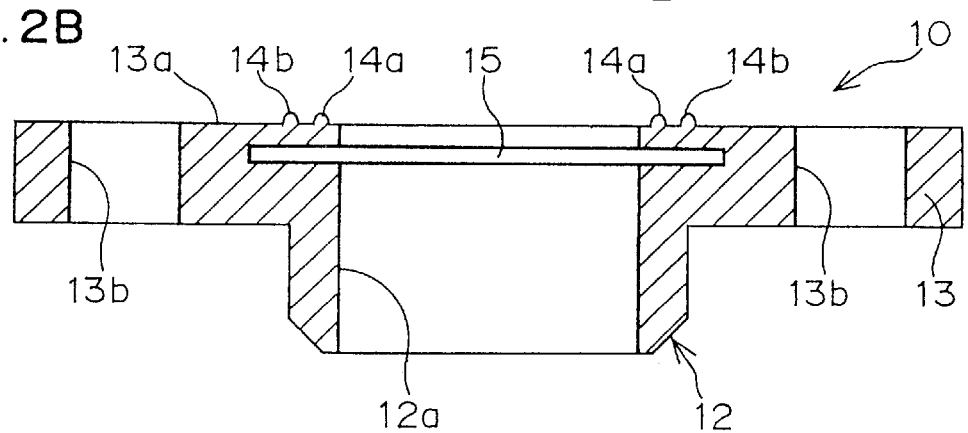
FIG. 2B is a cross-sectional view taken along the line 2B—2B in FIG. 2A.
Figure 2C:
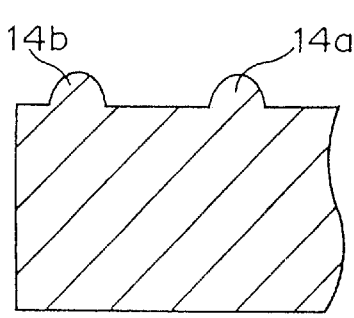
FIG. 2C is an enlarged cross-sectional view illustrating annular projections.

FIGS. 2A to 2C illustrates a tube joint in accordance with the first embodiment. The illustrated tube joint 10 includes a body portion 12 and a flange portion 13 formed integrally with the body portion 12 at one end of the body portion 12. The body and flange portions 12 and 13 are formed centrally with a bore 12a. The flange portion 13 has an outer surface 13a at which the tube joint 10 is connected to an opponent tube joint (not illustrated), and is formed with four holes 13b located coaxially with the bore 12a and spaced circumferentially equally to one another. The tube joint 10 and an opponent tube joint are connected to each other by inserting bolts into the holes 13b of the tube joint 11 and an opponent tube joint and fastening the bolts with nuts.

The flange portion 13 is further formed at the outer surface 13a thereof and in the vicinity of the bore 12a with annular projections 14a and 14b. The annular projection 14a has a smaller diameter than a diameter of the annular projection 14b. As illustrated in FIG. 2C, the annular projections 14a and 14b have a semicircular cross-section.

The bore 12a is formed at an inner wall thereof with an annular groove 15 which is coaxial with the bore 12a. The annular groove 15 has a greater diameter than a diameter of the annular projection 14b, and hence the annular projections 14a and 14b are ensured to be located above the annular groove 15. As illustrated in FIG. 2B, the annular groove 15 is formed at a depth within a thickness of the flange portion 13.

Figure 1A:
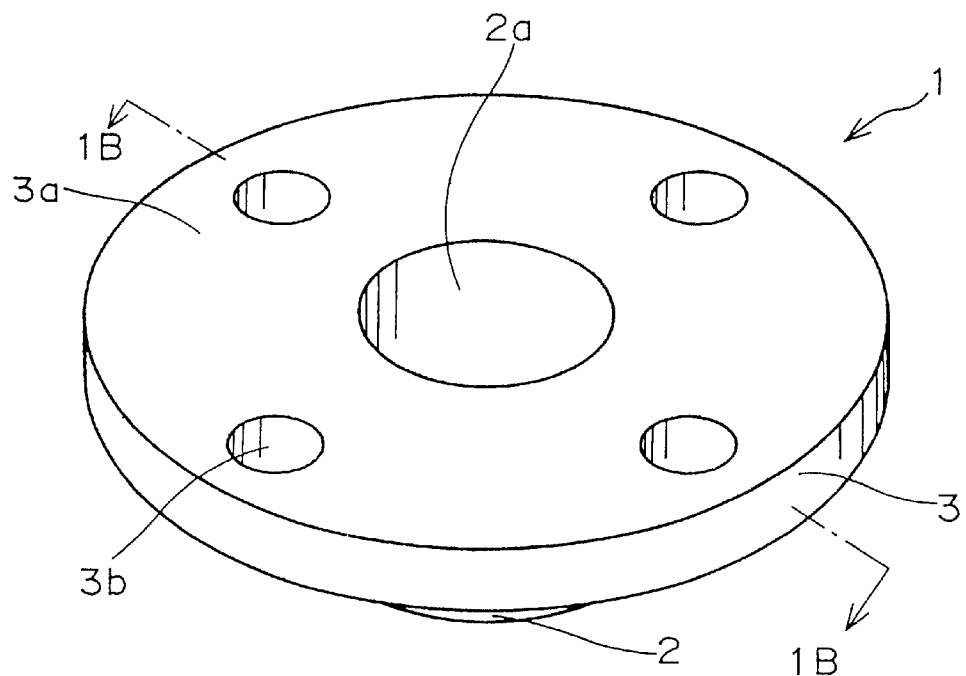
FIG. 1A is a perspective view illustrating a conventional flange type tube joint.
Figure 1B:
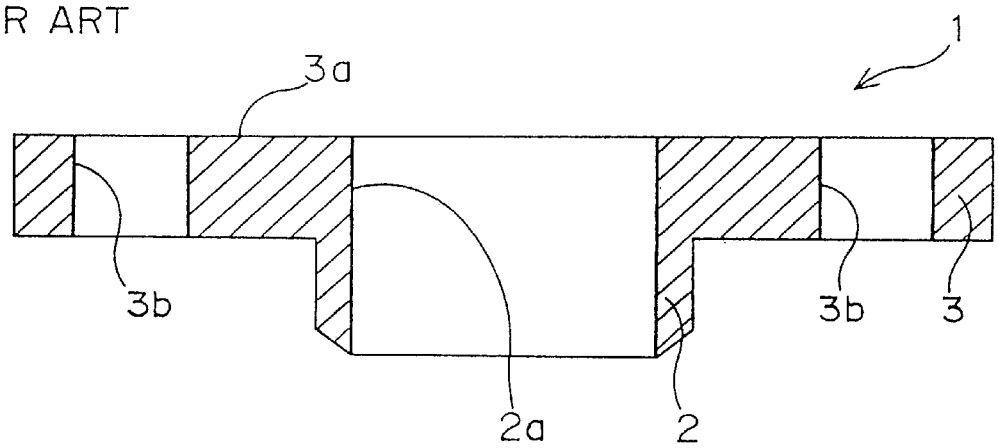
FIG. 1B is a cross-sectional view taken along the line 1B—1B in FIG. 1A.

There were prepared two sets of the tube joint 10 and a conventional tube joint as illustrated in FIGS. 1A and 1B, and there were conducted the experiments for evaluating the sealing ability of the tube joint 10. Hereinbelow, the results of the experiments are explained with reference to FIG. 3.

[Experiments 1 and 2]

The tube joint 10 is connected to the conventional tube joint 1 by means of bolts 5 and nuts 6. Tubes 7 are welded to the body portions 2 and 12. A water tank 8 is full of water 9. The tubes 7 are in communication with a compressed air source (not illustrated) through air pipes (not illustrated).

The experiments were conducted as follows. First, there were prepared the tube joint 10 in accordance with the first embodiment illustrated in FIGS. 2A to 2C and the conventional tube joint 1 illustrated in FIGS. 1A and 1B. The tubes 7 were welded to rear ends of the body portions 2 and 12. Then, the outer surfaces 3a and 13a of the flange portions 2 and 12 are made abutment with each other without a load therebetween. Then a gap between the outer surfaces 3a and 13a was measured. The gap was 0.37 mm. Then, the bolts 5 were inserted into the holes 3b and 13b of the flange portions 3 and 13, and fastened with the nuts 6 in such a way that the diagonally located bolts 5 were repeatedly fastened. Then, a gap between the outer surfaces 3a and 13a was measured twice for the experiment 1. The gap was 0.2 mm. Then, the same steps were repeated, and the gap was measured again for the Experiment 2. The gap was 0.1 mm.

Figure 3:
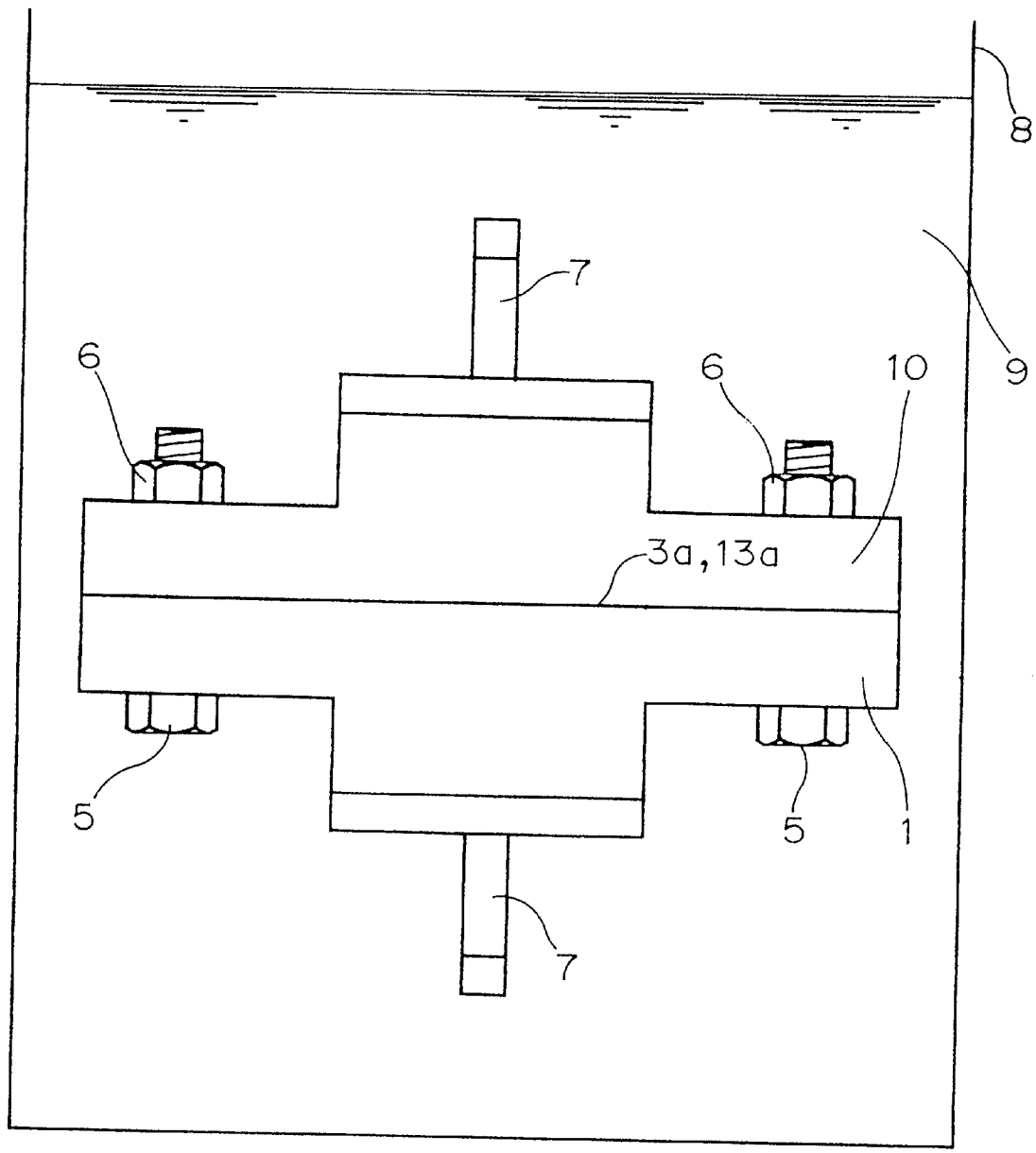
FIG. 3 is a schematic view illustrating a testing device for evaluating sealing ability.

Then, as illustrated in FIG. 3, after the connected tube joints 10 and 1 had been immersed in the water tank 8, a compressed air was introduced into the connected tube joints 10 and 1 from the compressed air source through the air pipes. Then, there was tested as to whether air was leaked through the outer surfaces 3a and 13a. The compressed air had a pressure at 2 kg/cm$^2$ which was gradually increased up to 10 kg/cm$^2$. There was not found any leakage of air through the outer surfaces 3a and 13a.

[Experiment 3]

Experiment 3 is different from Experiments 1 and 2 only in that the bolts 5 and nut 6 were not fastened diagonally, but fastened freely. There was not found any leakage of air through the outer surfaces 3a and 13a.

[Experiment 4]

The tube joints 10 and 1 were assembled and disassembled fifty times. The bolts 5 and nuts 6 were diagonally fastened in the first ten times, and freely fastened in the remaining forty times. Then, there was tested as to whether air was leaked through the outer surfaces 3a and 13a in the same manner as Experiment 1. There was not found any leakage of air through the outer surfaces 3a and 13a.

[Experiments 5, 6 and 7]

The tube joints 10 and 1 were connected to each other until the outer surfaces 3a and 13a were made tight contact with each other by diagonally fastening the bolts 5 to the nuts 6. The connected tube joints 10 and 1 was heated in constant temperature bathes at temperatures 150, 200 and 275° C. for five minutes for Experiments 5, 6 and 7, respectively, and then was cooled down. Then, the connected tube joints 10 and 1 was disassembled. Thereafter, the tube joints 10 and 1 were assembled again until the outer surfaces 3a and 13a were made tight contact with each other by diagonally fastening the bolts 5 to the nuts 6. Then, there was tested as to whether air was leaked through the outer surfaces 3a and 13a in the same manner as Experiment 1. There was not found any leakage of air through the outer surfaces 3a and 13a in all Experiments 5, 6 and 7.

[Experiment 8]

The connected tube joints 10 and 1 was heated in a constant temperature bath at 300° C. for ten minutes in the same way as Experiment 5. After the connected tube joints 10 and 1 had been immersed in a water tank to thereby rapidly cool down, there was conducted a test as to whether air was leaked through the outer surfaces 3a and 13a in the same manner as Experiment 1. There was not found any leakage of air through the outer surfaces 3a and 13a.

The connected tube joints 10 and 1 was disassembled, and assembled again. Then, there was conducted a test in the same way as Experiment 1 as to whether there was any leakage of air through the outer surfaces 3a and 13a. There was found quite slight leakage of air. This is considered because the outer surfaces 3a and 13a were deformed by rapidly cooling. However, the leakage was able to be stopped by varying a diameter of the annular groove to thereby increase resiliency of the outer surfaces 3a and 13a. It was confirmed that whether air was leaked through the outer surfaces 3a and 13a was not influenced by heat produced when the tubes 7 had been welded to the body portions 2 and 12.

[Experiment 9]

The tube joints 10 and 1 were connected to each other in the same manner as Experiment 1. The connected tube joints 10 and 1 was placed in 20 mmHg pressure, and stood for 24 hours. Then, the connected tube joints 10 and 1 was tested as to the airtightness. It was confirmed that the airtightness remained unchanged.

As explained with reference to the preferred embodiment, the formation of the annular groove 15 at an inner wall of the bore 12a provides the outer surface 13a with axial resiliency, which in turn provides the annular projections 14a and 14b, formed in the vicinity of the bore 12a to thereby have great axial resiliency, with sealing ability between the tube joint and an opponent tube joint. In addition, when fluid such as water flows through the bore 12a, the fluid exerts a pressure on the annular groove 15, which pressure cooperates with restoring force of the outer surface 13a to produce a force to push the outer surface 13a toward an opponent tube joint. Thus, the sealing ability of the tube joint 10 is significantly enhanced.

Figure 2D:
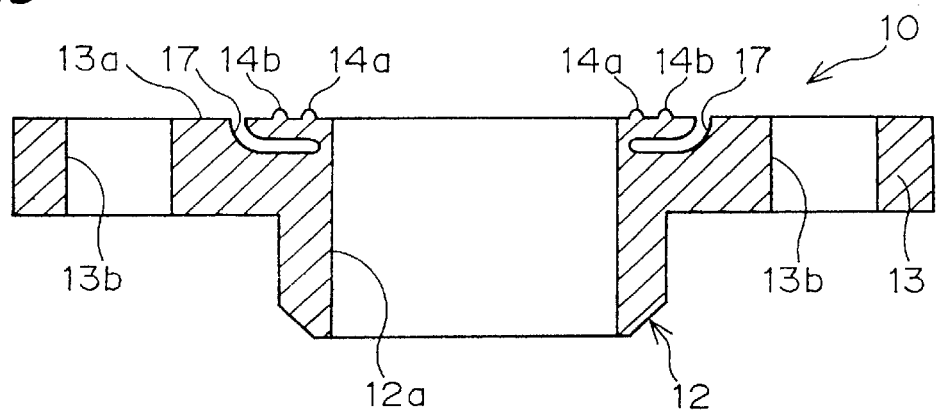
FIG. 2D is a cross-sectional view of a tube joint in accordance with a variant of the first embodiment.

There are many variants of the above mentioned first embodiment. As illustrated in FIG. 2D, there may be formed a groove 17 in place of the annular groove 15. The groove 17 starts at the outer surface 13a of the flange portion 13 and terminates at below the annular projections 14a and 14b. Similar to the annular groove 15 illustrated in FIGS. 2A and 2B, the groove 17 also provides the annular projections 14a and 14b with axial resiliency to thereby ensure sealing ability between the tube joint and an opponent tube joint.

Figure 2E:
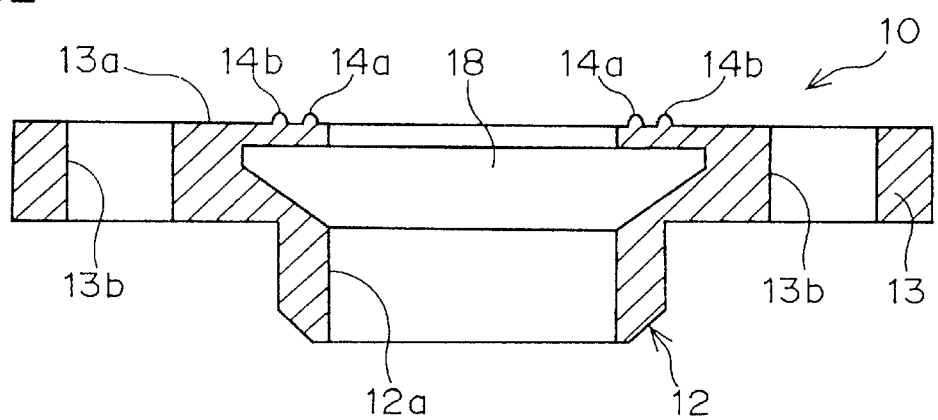
FIG. 2E is a cross-sectional view of a tube joint in accordance with another variant the first embodiment.

As an alternative, as illustrated in FIG. 2E, a recess 18 may be formed at an inner wall of the bore 12a. The recess 18 is more readily formed than the annular groove 15, resulting in greater fabrication efficiency of the tube joint.

Figure 2F:
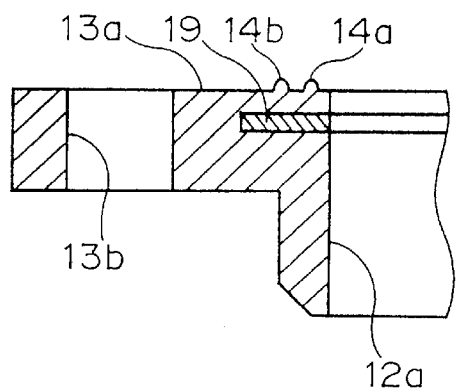
FIG. 2F is a cross-sectional view of a tube joint in accordance with still another variant of the first embodiment.

As partially illustrated in FIG. 2F, the groove 15 may be filled with resilient material 19 having greater resiliency than resiliency of the body portion 12. The annular groove 15 or recessed 18 may generate turbulent flow in fluid flowing through the bore 12a. The resilient material 19 filled in the annular groove 15 or recess 18 eliminates a step in fluid flow path, and hence prevents generation of turbulent flow. The resilient material 19 may be selected among any material, unless it has greater resiliency than a material of which the body portion 12 is made to ensure the annular projections 14a and 14b to be swingable. For instance, the resilient material 19 may be made of teflon.

Figure 2G:
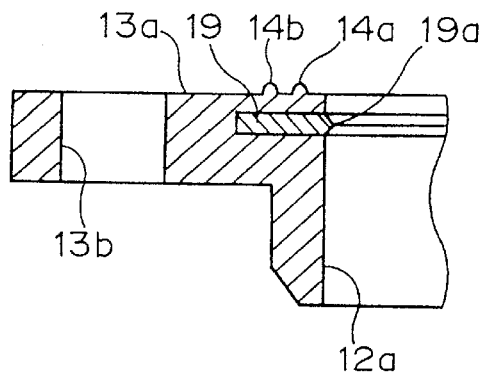
FIG. 2G is a cross-sectional view of a tube joint in accordance with yet another variant of the first embodiment.

It is in particular preferable that the resilient material 19 is made of copper. Since copper has germicidal action, sterilization is expected in fluid flowing through the bore 12a. When the resilient material 19 is made of copper, it is preferable that the resilient material 19 has a sharpened point 19a projecting in the fluid flowing in the bore 12a, as illustrated in FIG. 2G, because germicidal ions are likely to be ejected through a sharpened point.

Figure 2H:
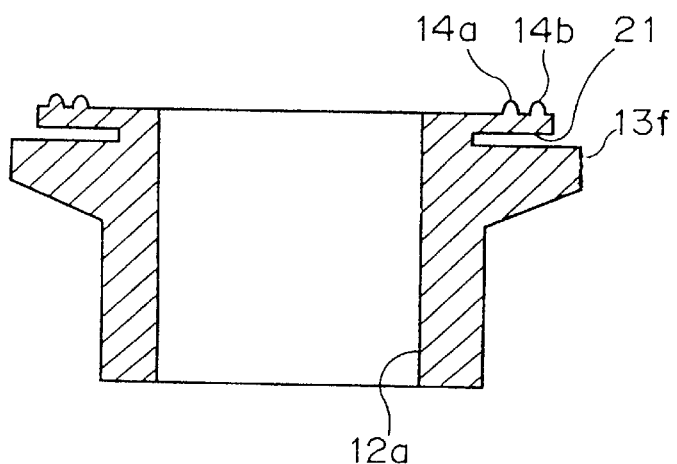
FIG. 2H is a cross-sectional view of a tube joint in accordance with still yet another variant of the first embodiment.

As illustrated in FIG. 2H, there may be formed a groove 21 starting at an outer sidewall 13f of the flange portion 13 and terminating at below the annular projection 14a located closer to the bore 12a than the annular projection 14b, in place of the groove 15 illustrated in FIGS. 2A and 2B. The groove 21 also provides the annular projections 14a and 14b with axial resiliency to thereby ensure sealing ability between the tube joint and an opponent tube joint. In addition, the groove 21 can be more readily formed than the groove 15.

Figure 2I:
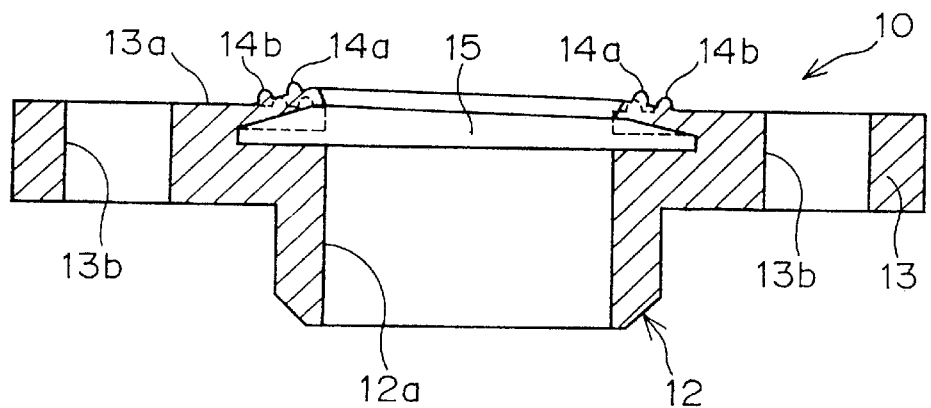
FIG. 2I is a cross-sectional view of a tube joint in accordance with another variant of the first embodiment.

Another variant of the first embodiment is illustrated in FIG. 2I. In the illustrated variant, a resilient portion 22, defined as a portion of the outer surface 13a located above the annular groove 15, is designed to in advance have a slight inclination so that the resilient portion 22 is in level with the outer surface 13a when the tube joint is made in contact with an opponent tube joint, as indicated with a broken line. In this variant, since the resilient portion 22 is in level with the outer surface 13a when pressurized due to fluid flow in the bore 12a, it is ensured that the annular projections 14a and 14b formed on the resilient portion 22 can make more intensive contact with an opponent tube joint.

Figure 4A:
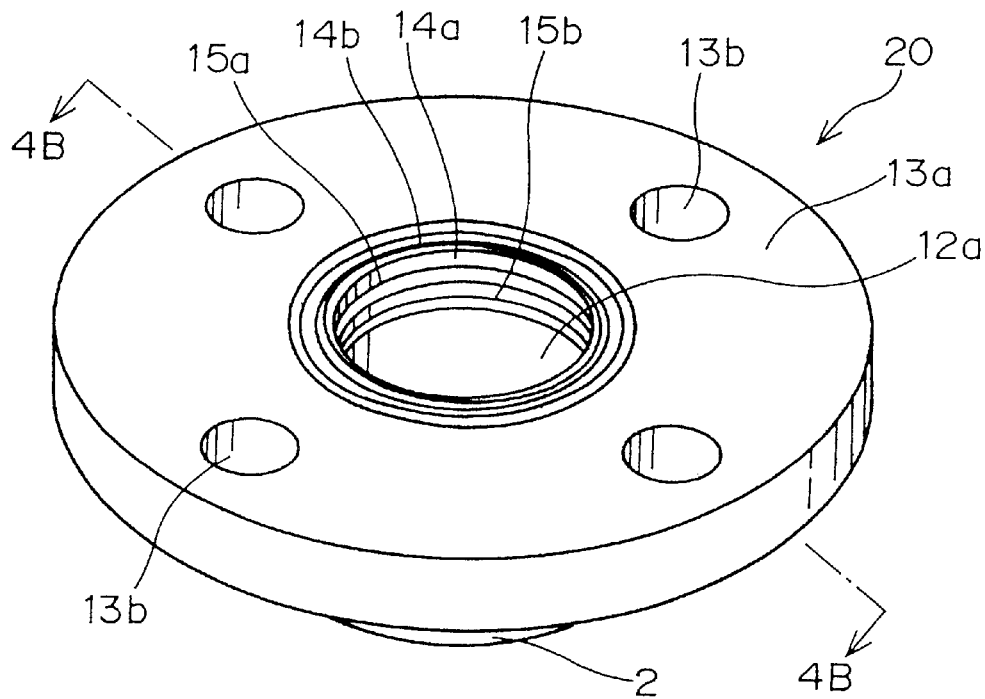
FIG. 4A is a perspective view illustrating a tube joint in accordance with the second embodiment of the present invention.
Figure 4B:
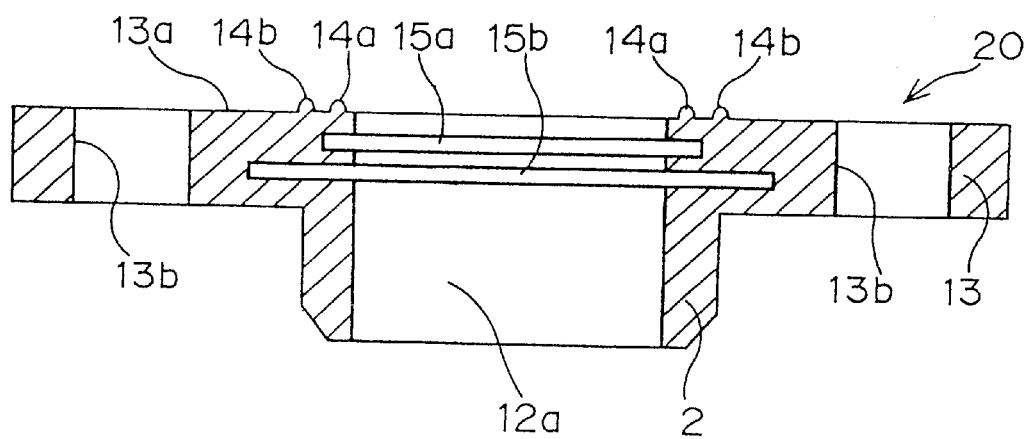
FIG. 4B is a cross-sectional view taken along the line 4B—4B in FIG. 4A.

FIGS. 4A and 4B illustrate a tube joint in accordance with the second embodiment. Parts or elements corresponding to the first embodiment have been provided with the same reference numerals (the same is applied to later mentioned embodiments). The second embodiment is different from the first embodiment in that there are formed first and second annular grooves 15a and 15b at an inner wall of the bore 12a. The first annular groove has a diameter greater than a diameter of the annular projection 14a, but smaller than a diameter of the annular projection 14b. The second annular groove 15b has a greater diameter than a diameter of the annular groove 14b. Hence, the second annular groove 15b has a greater diameter than a diameter of the first annular groove 15a. The annular grooves 15a and 15b are formed at a depth within a thickness of the flange portion 13.

When the flange portion 13 has a greater thickness, the greater number of the annular grooves may be formed. Similarly, when the outer surface 13a has a greater diameter, the greater number of the annular projections may be formed.

The second embodiment provides greater resiliency to the outer surface 13a of the flange portion 3 than the first embodiment, resulting in higher sealing ability between the tube joint 20 and an opponent tube joint. In addition, since diameters of the annular grooves 15a and 15b are determined in connection with diameters of the annular projections 14a and 14b, it is possible to control resiliency of the outer surface 13a to thereby ensure higher sealing ability regardless of pressure fluctuation of fluid flowing through the bore 12a.

Figure 5A:
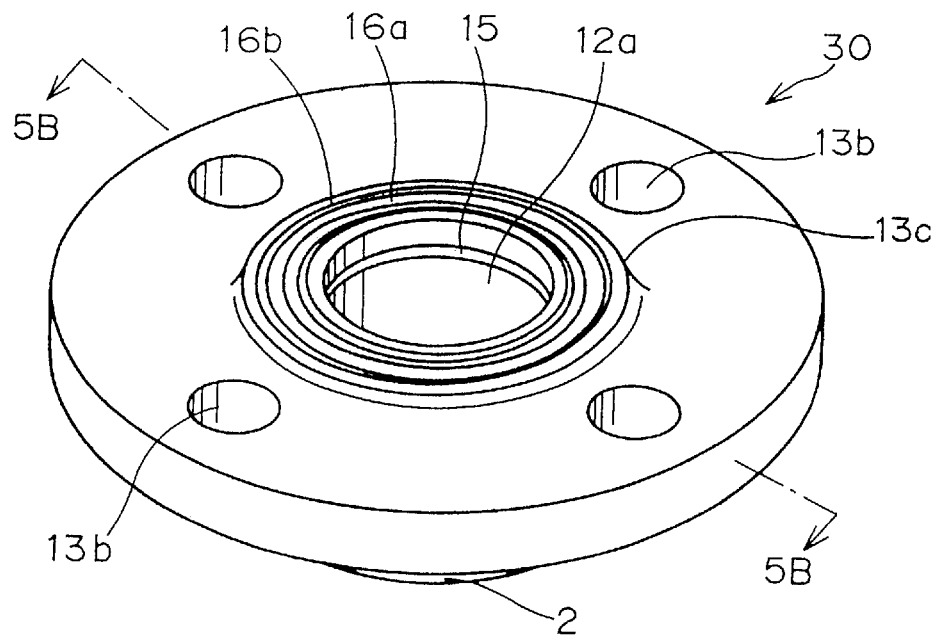
FIG. 5A is a perspective view illustrating a tube joint in accordance with the third embodiment of the present invention.
Figure 5B:
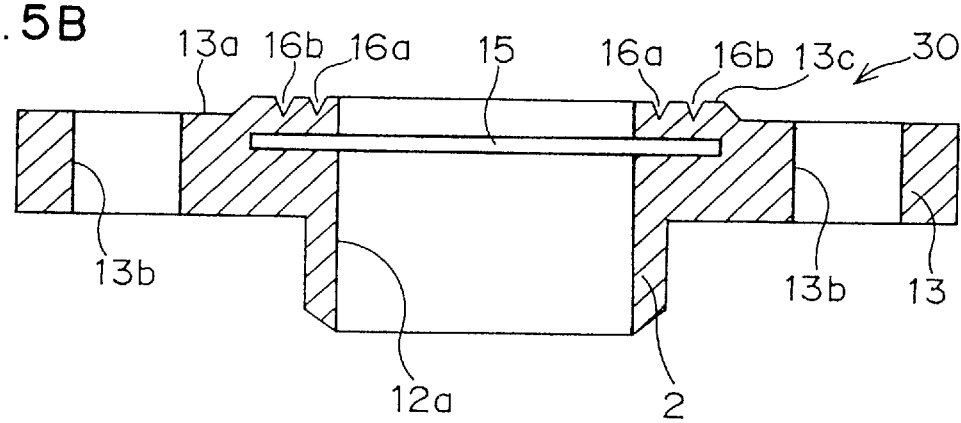
FIG. 5B is a cross-sectional view taken along the line 5B—5B in FIG. 5A.
Figure 5C:
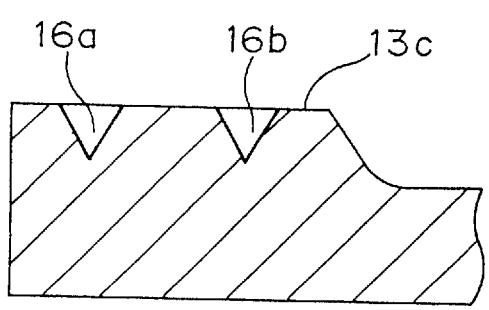
FIG. 5C is an enlarged cross-sectional view illustrating annular recesses.

FIGS. 5A to 5C illustrate a tube joint in accordance with the third embodiment. The tube joint 30 in accordance with the third embodiment is different from the first embodiment in that there is formed a raised region 13c at the outer surface 13a, and first and second annular recesses 16a and 16b are formed in the vicinity of the bore 12a in the raised region 13c. The first and second annular recesses 16a and 16b have a smaller diameter than a diameter of the annular groove 15, and hence are located above the annular groove 15. As illustrated in FIG. 5C, the first and second annular recesses 16a and 16b have a reverse triangular cross-section. The first and second annular recesses 16a and 16b are designed to be fittable to annular projections formed on an outer surface of an opponent tube joint.

Figure 6A:
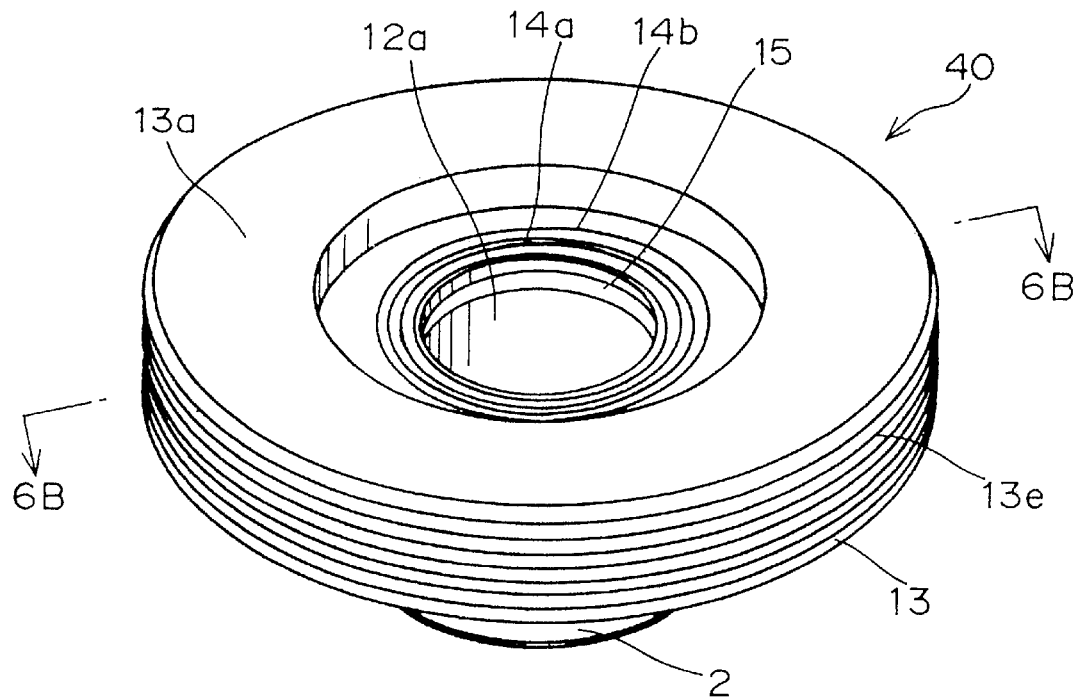
FIG. 6A is a perspective view illustrating a tube joint in accordance with the fourth embodiment of the present invention.
Figure 6B:
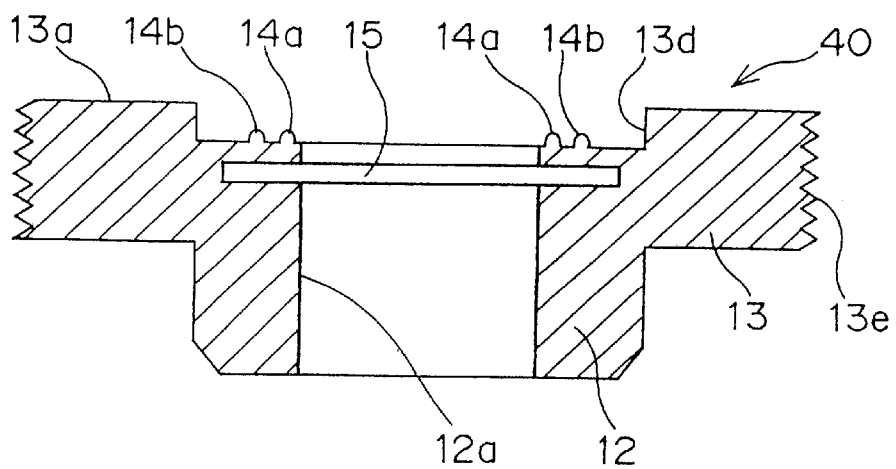
FIG. 6B is a cross-sectional view taken along the line 6B—6B in FIG. 6A.

FIGS. 6A and 6B illustrate a tube joint in accordance with the fourth embodiment. The tube joint 40 in accordance with the fourth embodiment is different from the first embodiment in that the flange portion 13 has a greater thickness than the flange portion of the first embodiment and there is formed a recessed region 13d at the outer surface 13a, and that the flange portion 13 is formed with a externally threaded portion 13e at a circumference thereof in place of the holes 13b. The annular projections 14a and 14b are formed within the recessed region 13d.

Figure 7A:
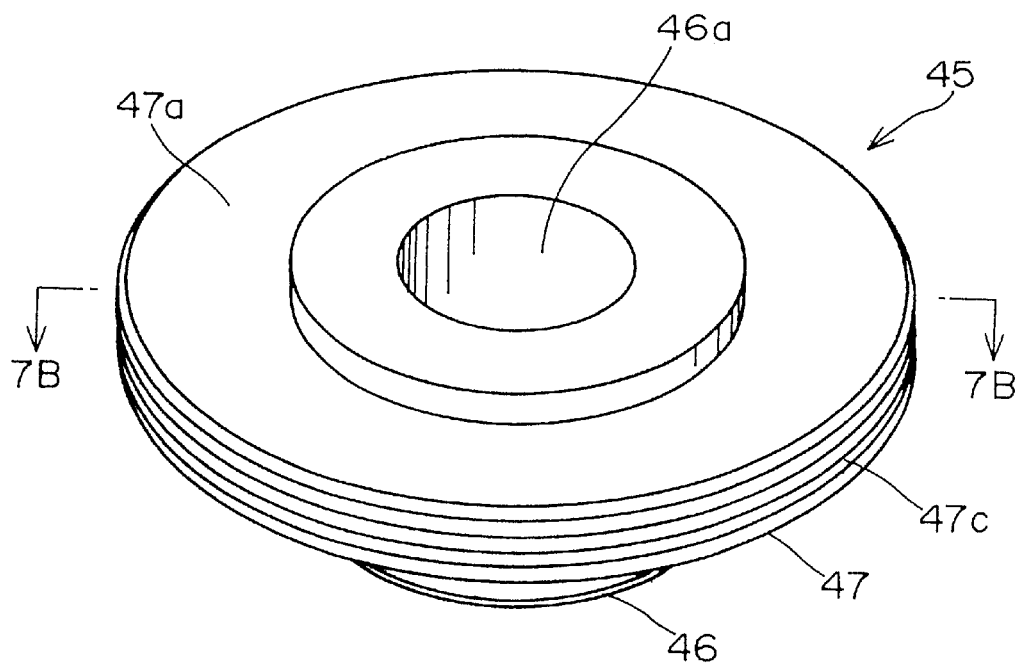
FIG. 7A is a perspective view illustrating a tube joint to which the tube joint in accordance with the present invention is coupled.
Figure 7B:
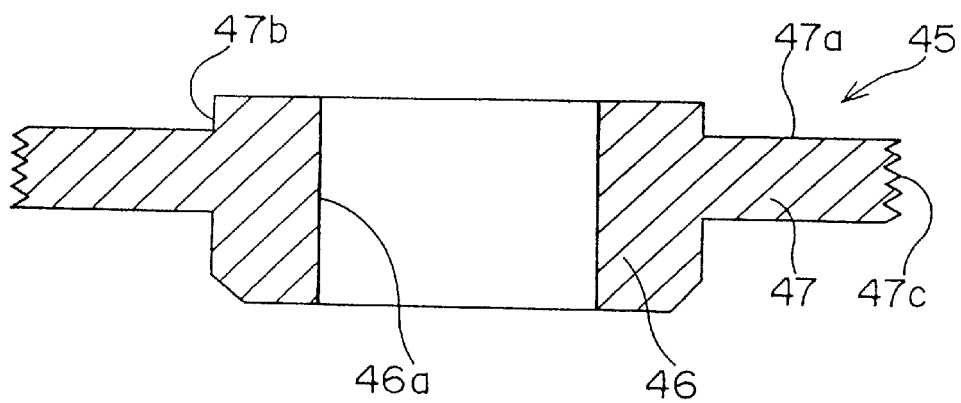
FIG. 7B is a cross-sectional view taken along the line 7B—7B in FIG. 7A.

FIGS. 7A and 7B illustrate an opponent tube joint 45 to which the tube joint 40 in accordance with the fourth embodiment is coupled. The illustrated tube joint 45 includes a body portion 46 and a flange portion 47 formed integrally with the body portion 46 around an outer wall of the body portion 46. The body and flange portions 46 and 47 are formed centrally with a bore 46a having the same diameter as a diameter of the bore 12a. The flange portion 47 is formed at an outer surface 47a thereof with a raised region 47b which is designed to be fittable into the recessed region 13d. Namely, the raised region 47b has the same diameter and height as the diameter and depth of the recessed region 13d of the flange portion 13. Hence, when the tube joint 40 is coupled to the tube joint 45, the outer surfaces 13a and 47a make contact with each other without any gap therebetween. The flange portion 47 is formed at an outer circumference thereof with an externally threaded portion 47c. The tube joint 40 is coupled to the tube joint 45 by screwing a cap nut (not illustrated) to the threaded portions 13e and 47c of the flange portions 13 and 47.

In accordance with the fourth embodiment, since the raised region 47b of the tube joint 45 is fit into the recessed region 13d of the tube joint 40, the tube joints 40 and 45 are firmly coupled with each other, and in addition the combination of the annular projections 14a and 14b and the annular groove 15 provide high sealing ability similarly to the first embodiment.

Figure 8A:
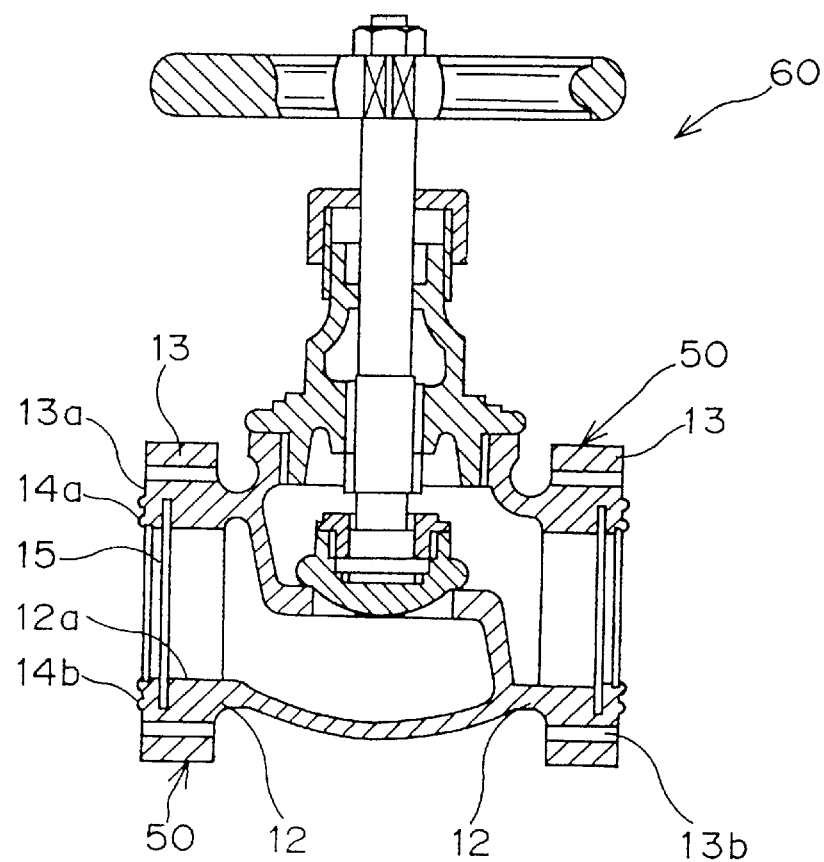
FIG. 8A is a cross-sectional view illustrating a valve including a tube joint in accordance with the fifth embodiment of the present invention.
Figure 8B:
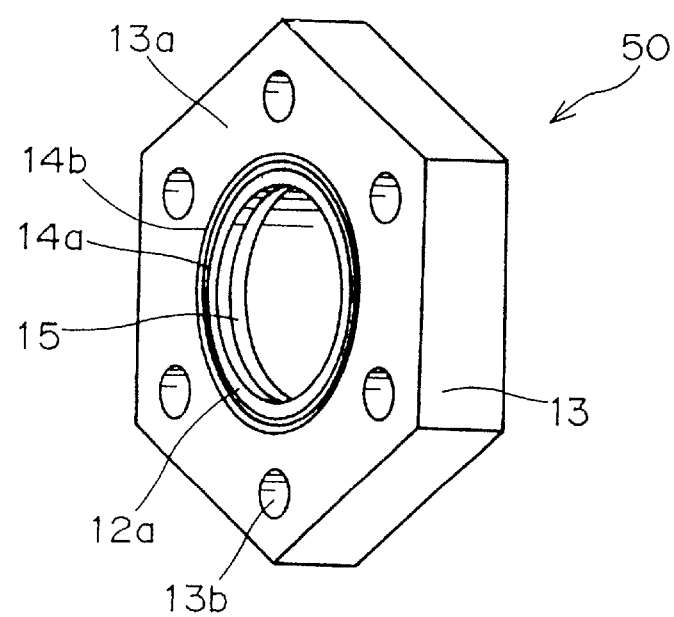
FIG. 8B is a perspective view illustrating a tube joint in accordance with the fifth embodiment of the present invention.

FIG. 8A illustrates an example of application of the tube joint in accordance with the present invention. As illustrated, a valve 60 includes tube joints 50 in accordance with the fifth embodiment. As illustrated in FIG. 8B, the tube joint 50 is almost the same in structure as the tube joint 10 in accordance with the first embodiment, but different in that the tube joint 50 has an hexagonal cross-section, and is formed with six holes 13b. The tube joints 50 are positioned at inlet and outlet of the valve 60.

In order to confirm the advantageous characteristics of the present invention, the inventors asked Fukuoka Prefecture Industrial Laboratory, a non-profitable official organization, to evaluate a tube joint in accordance with the present invention.

There were prepared three of the tube joints 10 in accordance with the first embodiment illustrated in FIGS. 2A and 2B, two of which is made of SS41 and the other SUS 304. There was also prepared a tube joint in accordance with the variant of the first embodiment, illustrated in FIG. 2H. There were conducted hydraulic tests about those tube joints. The results are as follows.

1. Tube joint made of SS41 in accordance with the first embodiment illustrated in FIGS. 2A and 2B A pressure of 53 kgf/cm$^2$ was applied to the tube joint for ten minutes. There was found no drop in pressure and no leakage.

2. Tube joint made of SS41 in accordance with the first embodiment illustrated in FIGS. 2A and 2B A pressure of 70 kgf/cm² was applied to the tube joint for ten minutes. There was found no drop in pressure and no leakage.

3. Tube joint made of SUS 304 in accordance with the first embodiment illustrated in FIGS. 2A and 2B A pressure of 83 kgf/cm² was applied to the tube joint for ten minutes. There was found no drop in pressure and no leakage.

4. Tube joint made of S25C in accordance with the variant of the first embodiment illustrated in FIG. 2H A pressure of 19 kgf/cm² was applied to the tube joint for ten minutes. There was found no drop in pressure and no leakage.

Thus, it is officially confirmed that the tube joint in accordance with the present invention provides high sealing ability, even though a gasket is not used.

As mentioned so far, the tube joint in accordance with the present invention eliminates the necessity of using a gasket. However, it should be noted that a gasket may be used in combination with the tube joint in accordance with the present invention.

While the present invention has been described in connection with the preferred embodiments in which a sealing structure in accordance with the present invention is applied to a tube joint, it should be noted that a sealing structure in accordance with the present invention can be applied to any other apparatuses which requires gas and/or fluid sealing. For instance, the present invention can be applied to an automobile engine, because it is required in an automobile engine that a cylinder block is hermetically sealed with a cylinder head.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A sealing structure comprising a body portion having an outer surface for contact with an opponent part, said outer surface having a flat portion, said body portion being formed with a bore therethrough, said flat portion having at least one annular projection, projecting from said flat portion and swingable in a direction in which said bore extends, and said body portion is formed with a groove starting at said outer surface of said body portion and terminating below said annular projection.

2. A sealing structure comprising a body portion having an outer surface for contact with an opponent part, said outer surface having a flat portion, said body portion being formed with a bore therethrough, said flat portion having at least one annular projection, projecting from said flat portion and swingable in a direction in which said bore extends, and said body portion is formed with a groove starting at an outer side wall of said body portion and terminating below said annular projection.

3. A sealing structure comprising a body portion having an outer surface for contact with an opponent part, said outer surface having a flat portion, said body portion being formed with a bore therethrough, said flat portion having a plurality of annular projections, projecting from said flat portion and swingable in a direction in which said bore extends, wherein an annular projection having a smaller diameter, has a greater height than an annular projection having a greater diameter.

4. A sealing structure comprising a body portion having an outer surface for contact with an opponent part, said outer surface having a flat portion, said body portion being formed with a bore therethrough, said flat portion having at least one annular projection disposed in said flat portion, projecting from said flat portion and swingable in a direction in which said bore extends, and said body portion is formed at an inner wall of said bore with a plurality of grooves having different diameters, so that said projection is swingable.

5. A sealing structure, comprising:

a body portion having an outer surface for contact with an opponent part, and having a bore formed therethrouqh;

a flat portion on said outer surface; and at least one integral annular projection projecting from said flat portion, swingable in a direction in which said bore extends wherein said body portion is formed at said outer surface thereof with a raised region having a surface on which at least one recess is formed.

6. The sealing structure as set forth in claim 4, wherein an annular groove located closer to said outer surface of said body portion has a smaller diameter than diameters of annular grooves located further from said outer surface of said body portion.

* * * * *